Nov. 24, 1959 V. J. EVICH 2,913,759
FISH PROCESSING APPARATUS
Filed Feb. 11, 1957 3 Sheets-Sheet 1

INVENTOR:
VINCENT J. EVICH
BY Fulwider, Mattingly
and Huntley
ATTORNEYS.

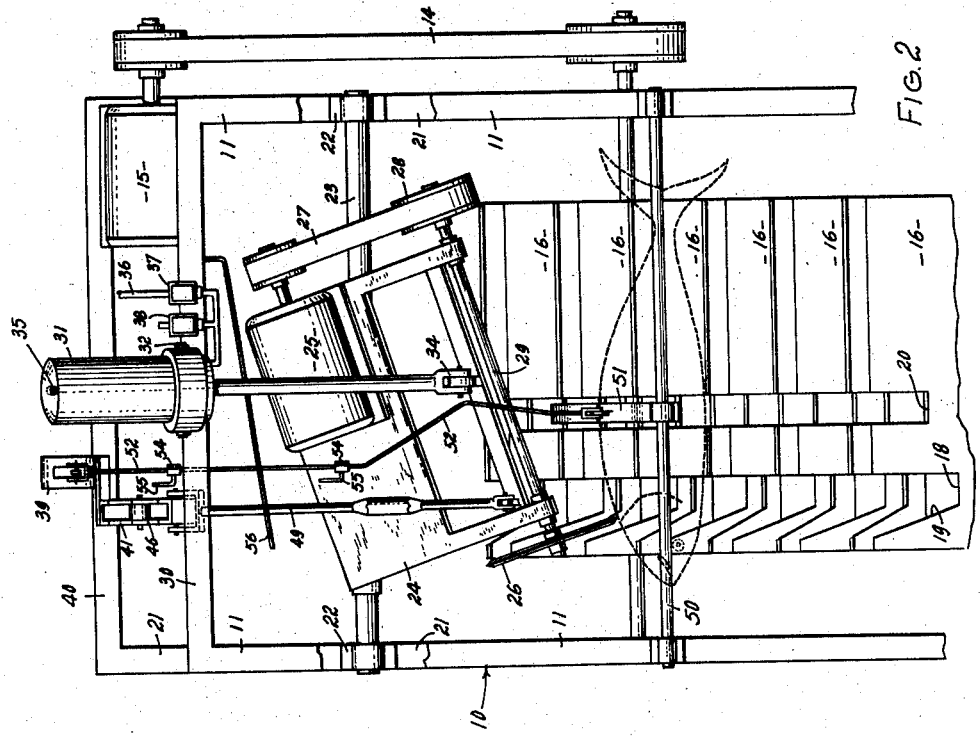

Nov. 24, 1959  V. J. EVICH  2,913,759
FISH PROCESSING APPARATUS
Filed Feb. 11, 1957  3 Sheets-Sheet 3
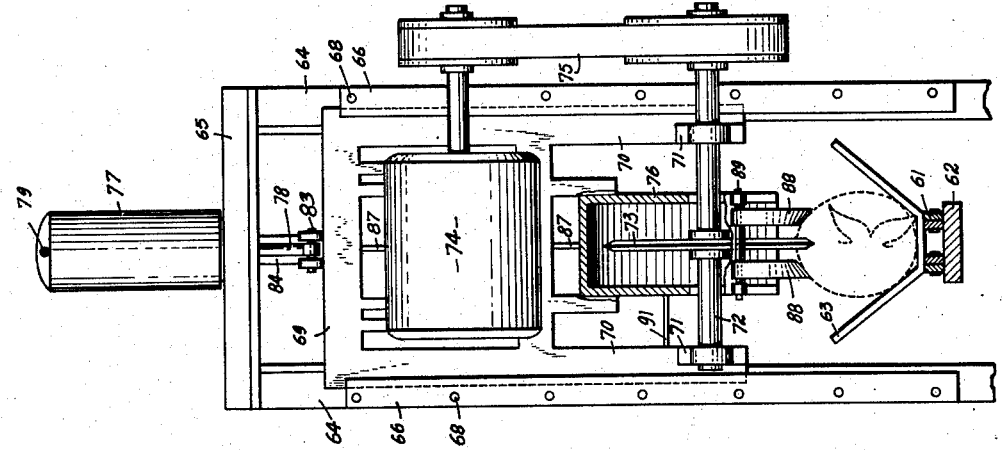
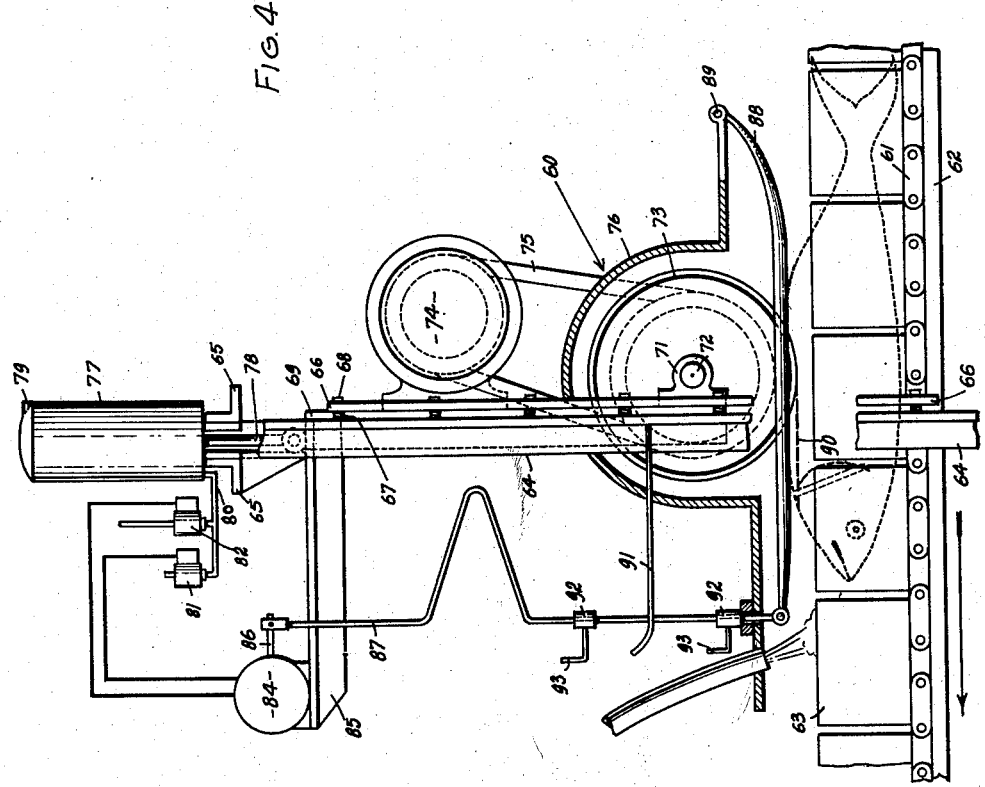
INVENTOR:
VINCENT J. EVICH
BY Fulwider, Mattingly
and Huntley
ATTORNEYS.

United States Patent Office 2,913,759
Patented Nov. 24, 1959

2,913,759

FISH PROCESSING APPARATUS

Vincent J. Evich, San Pedro, Calif.

Application February 11, 1957, Serial No. 639,347

11 Claims. (Cl. 17—4)

The present invention relates generally to fish processing apparatus and especially to fish dressing machines in which it is desired to control the positioning of a dressing tool in accordance with variations in the sizes of fish.

In the canning of fish it is desirable to mechanize every step of the process as far as possible in order to achieve high production, lower cost and greater efficiency. The canning end of the process is almost entirely mechanized but with certain types of larger fish and particularly in the case of expensive species such as tuna, mechanization of many of the steps in the dressing of fish preparatory to canning has heretofore been considered impractical since attempts at mechanization have resulted in costly wastage. Due to the high initial cost of such fish as tuna, it is highly important to prevent any such wastage of edible portions and consequently many steps in dressing the fish have had to be done manually by highly skilled workers.

One of the obstacles to the mechanization of certain steps in dressing fish has been the lack of satisfactory means to control the positioning of a powered dressing tool with regard to variations in size of the fish. Obviously, fish of a single catch will vary considerably in size, not only in length, but also in breadth and depth. For example, in processing tuna it is necessary to first slit the gullet with a cutter passing over the gills. This cut is made downwardly from the belly of the fish and must penetrate deeply enough to completely sever the tough membranes of the gullet but must not decapitate the fish. In tuna the back loin extends forwardly over the head so that if the fish were decapitated a great amount of edible meat would be lost. Therefore, the tool must be controlled in such a way that it penetrates only deeply enough to sever the gullet without entering into the back loin and the extent of this penetration will vary with the sizes of the fish passing under the tool. Since this tool must pass across the throats of the fish, it must be responsive to variations in the depth of fish passing thereunder.

In other steps in dressing fish it may be necessary for the particular tool being employed to conform to the longitudinal or lengthwise contour of the fish. Thus, with tuna after the throat has been cut it is necessary to slit the belly of the fish from the head back to the vent. Therefore this tool is preferably controlled in accordance with the contour of the belly since it is desirable to have the tool cut through the skin of the belly but not deeply into the entrails contained in the belly cavity. It is also desirable that this tool leave the belly cavity at the vent of the fish in order to prevent any cutting of edible meat between the vent and tail. Thus, in this instance the tool is controlled with regard to variations in the length and belly contour of the fish. In a similar manner, in other dressing steps it may be desirable to control the particular tool being used with regard to the breadth of the fish.

It is a major object of the present invention to provide in a fish dressing apparatus having a powered dressing tool, control means for positioning the tool that is directly responsive to variations in the size of fish advancing towards the tool.

Another object of my invention is to provide control means for fish processing apparatus by which fish of different sizes can be mechanically dressed in an efficient manner without any waste of edible portions of meat whereby certain manual dressing operations are eliminated.

Yet another object of my invention is to provide control means for fish processing apparatus that is of an extremely sensitive nature and adapted for immediate reaction to variations in size of fish passing thereunder. This characteristic of my invention adapts it for high volume production and/or accurate, substantially continuously changing positioning of a dressing tool whereby a desired cutting contour of a fish can be traced by the tool.

In carrying out the invention I provide a sensing element that is responsive to variations in sizes of fish advancing towards the dressing tool. This element can take many different forms, mechanical or electro-mechanical, but the present embodiment takes the form of a freely movable member that is suspended in the path of fish moving thereunder on a conveyor. The extent of movement or displacement of the sensing member is transmitted through appropriate linkage to a double throw type of electrical switch which in turn controls a pair of air valves. A pneumatic motor or cylinder is controlled by this pair of valves and the cylinder is in turn adapted to raise or lower the dressing tool in order to control the depth of penetration of the tool into the fish. The sensing element is yieldably suspended in lowered position and when displaced by a fish closes the switch to actuate one of the valves that leads to a source of air pressure in order to lift the dressing tool by means of the pneumatic motor. Interconnected between the dressing tool and the switch is an equalizing linkage that turns off the switch when the sensing element reaches the limit of its movement, thus closing the previously actuated valve and halting the tool in properly adjusted position.

Assuming the next fish to be dimensionally smaller, after the first fish has passed beyond the range of the sensing element, said element will of its own weight fall into contact with the next fish. This lowering of the sensing element closes another terminal of said switch to open the other of said pair of valves which results in venting the air cylinder to the atmosphere. The dressing tool is thus lowered until the switch is turned off by the aforementioned equalizing linkage whereby the valve to the atmosphere closes in order to halt the lowering of the tool.

Ordinarily the sensing element and the tool will be aligned in parallelism with the path of travel of the fish so that both the sensing element and tool will act on the same dimension of the fish. However, in some applications it may be necessary to have the sensing element laterally positioned from the tool. For example, in cutting the gullets of tuna, the rotary cutter, although raising and lowering in a path normal to the plane of the conveyer carrying the fish, is slanted into substantially the same plane as that defined by a median cutting line across the gills. This arrangement is desirable in order to save portions of edible meat behind the head and between the gills. The desired cutting line extends through the gills at an angle to the longitudinal axis of the fish and the cutter is positioned accordingly, whereby in its up and down movement it occupies a space in which the sensing element would otherwise be positioned. It therefore becomes necessary to place the sensing element laterally adjacent to the cutter.

This lateral placement of the sensing element makes it necessary to compensate for the difference in dimensional variation between the part of the fish being worked on by the tool and that part to which the sensing element reacts. Thus, in the gulleting operation just mentioned, the sensing element is positioned over deeper parts of the fish belly while the cutter acts on the relatively shallow throat parts. Even if the sensing element were closely adjacent to the cutter, the ratio between the amplitude of movement of the sensing element and the desired amplitude of movement of the cutter would not be one to one and it becomes necessary to reduce this ratio. In order to reduce this ratio, I have provided adjustment means in the previously mentioned equalizing linkage whereby only a certain desired proportion of the travel of the sensing element is translated into movement of the tool.

The above mentioned general objects of my invention, together with other inherent objects, will appear from the following detailed description of certain apparatus embodying the invention and from the drawings annexed hereto, in which:

Figure 2 is a front end view of the apparatus shown in Figure 1;

Figure 3 is a side elevational view of a tuna belly slitting machine embodying another form of the control means of my invention;

Figure 4 is a front end view with parts broken away of the apparatus shown in Figure 3;

Figure 5 is a plan view with parts broken away of an alternate form of valve controlling means for use in my invention; and Figure 6 is a vertical sectional view of still another form of valve control means that can be used with my invention.

Figure 1:
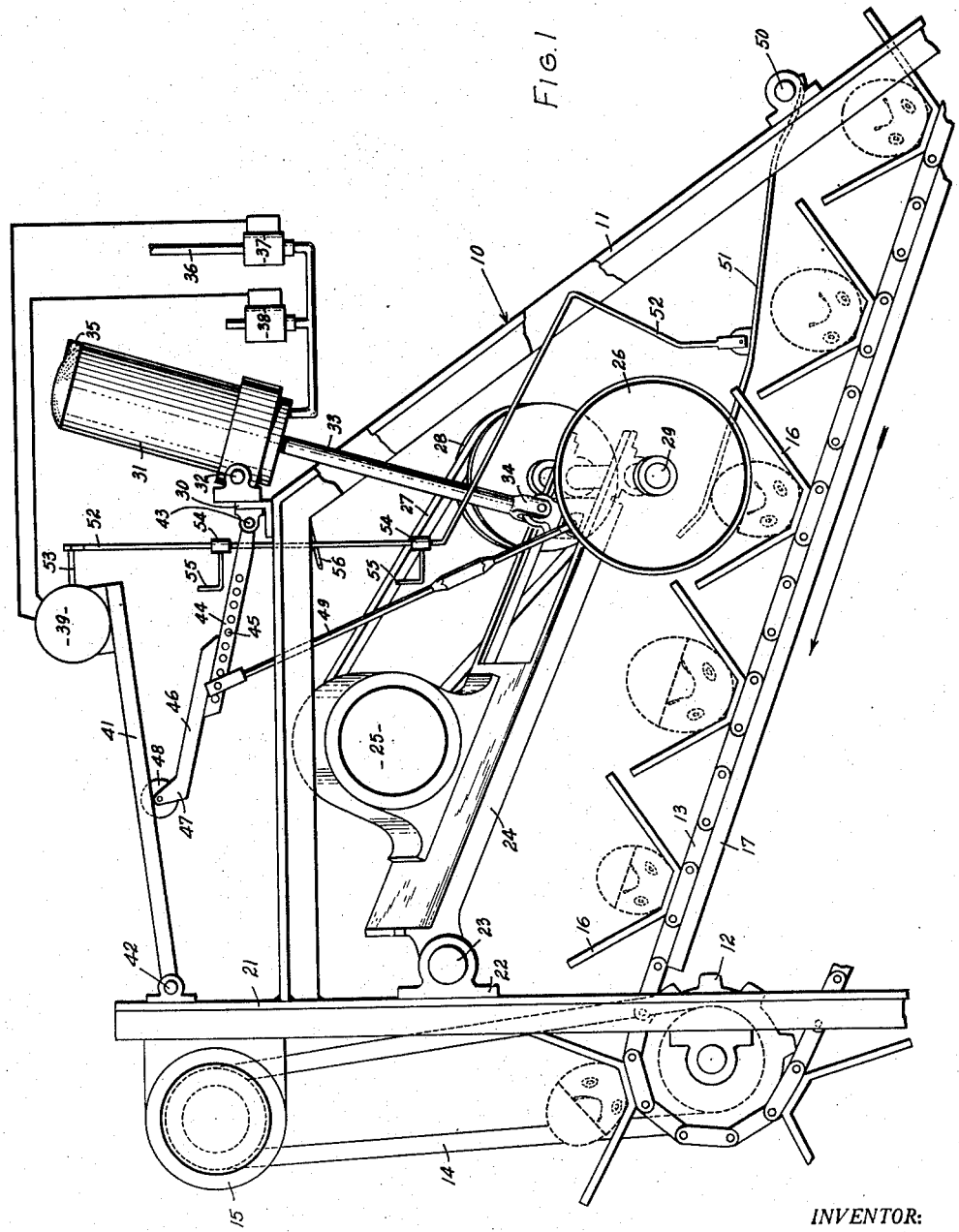
Figure 1 is a side elevational view of a tuna throat cutting or gulleting machine embodying the control means of my invention.

Referring now to Figures 1 and 2 of the drawings, there is shown a tuna gulleting machine designated generally by the numeral 10 that includes control means for positioning a rotary knife in response to variations in the sizes of the fish passing thereunder. A frame 11 mounts a pair of sprockets 12 (one of which is shown) that support an endless conveyer 13. The sprocket 12 shown at the exit or rear end of conveyer 13 is driven by any suitable means such as a belt 14 from a motor 15 and carries a plurality of substantially V-shaped fish receiving buckets 16 that extend transversely thereacross. Referring to Figure 1 it will be seen that the upper flight of conveyer 13 is slidably movable over an inclined rail 17 whereby fish carried in bucket 16 are gravitationally seated in a fixed position towards the lower side of the bucket.

The fish are manually placed belly up in the buckets 16 which are adapted in the manner shown in Figure 2 to provide means to indicate the proper positioning of the fish. On the left end thereof, as viewed in Figure 2, each of the opposite walls of buckets 16 is provided with a cutter clearance slot 18 that is adapted to permit passage therethrough of the slanted cutting disc, later to be described. The centrally disposed edges of the slots 18 are vertical while the outer edges 19 thereof are formed at an angle which is approximately the same as the slant of the cutter disc. As is indicated by the dotted outline of the fish in Figure 2, each fish, irrespective of its size, is properly positioned for alignment with the cutting tool when the gills thereof are placed in registration with slot 18 with root portions of the gills, adjacent to the slanted edge 19 of the slot. When positioned in this manner, the fish will be severed from the upwardly facing belly thereof through the throat portions in a plane intersecting the gills along lines intermediate the front and rear ends of the gills. With this arrangement, the root portions of the gills will remain attached to the head, which is later removed from the body of the fish, while the outer portions of the gills will be totally severed and will drop off. This results in the saving of edible portions of the meat disposed between the gills. In a centrally disposed portion thereof, each of the buckets 16 is formed with a second clearance slot 20 that is adapted to freely pass the sensing element later to be described.

The frame 11 at its rear end and on opposite sides of the conveyer 13 includes a pair of vertical standards 21 each of which has affixed to its forward face a pillow block 22 for supporting opposite ends of a horizontal shaft 23 that is adapted to pivotally connect an auxiliary frame 24 to the frame 11. The auxiliary frame 24 mounts a knife motor 25 which is drivingly connected to a rotary cutter 26 mounted at the forward end of frame 24 through the medium of a drive belt 27, pulley 28 and knife mounting shaft 29.

It will be observed that the pivotal axis of the frame 24 is horizontally disposed so that the free end of this auxiliary frame is vertically movable. At the same time the frame 24 is inclined from the horizontal in a direction transversely of the conveyer 13 in order to support the rotary knife 26 in the manner shown in Figure 2. With this arrangement, the knife 26 is adapted for registration with the cutter clearance slots 18 and the knife is thus adapted to cut through the gullet of the fish on the desired angle between the gills of the fish thereby avoiding any wastage of the edible portions between the gills as aforesaid.

Above the knife 26, the frame 11 includes a transversely extending horizontal beam 30 at whose mid-point the lower end of a pneumatic cylinder 31 is pivotally connected thereto, as is indicated by the numeral 32. Reciprocally slidably mounted in the cylinder 31 is a piston (not shown) that carries a rod 33 protruding through the lower end of the cylinder, and whose lower end is pivotally connected as at 34 to the forward free end of the auxiliary frame 24. This arrangement serves to vertically adjust the knife 26 in response to actuation of the cylinder 31 in the manner presently to be described.

The upper end of cylinder 31 is vented to the atmosphere through a bore 35 while the lower end of the cylinder on the opposite side of the piston is in communication with a source of air under pressure (not shown) by means of a conduit 36 or the like. Operatively associated with the conduit 36 are a solenoid actuated air pressure valve 37 and a solenoid operated relief valve 38. Both of these valves are normally held closed by spring means or the like whereby the air pressure entrapped on the lower side of the cylinder piston serves to maintain the frame 24 in a stationary position. The valve 38 is offset from the conduit 36 at a point between the cylinder 31 and valve 37 so that when the air pressure valve 37 is open the lower side of the cylinder piston communicates with a source of air under pressure whereby the rod 33 is raised in order to elevate the rotary knife 26. Conversely when the air pressure valve 37 is closed and the valve 38 is opened, the air pressure entrapped on the lower side of the cylinder piston is bled to the atmosphere whereby the rod 33 is permitted to lower until such time as the valve 38 closes in response to the equalizing linkage means later to be described.

In order to control the amplitude of movement of the rotary knife 26, both valves 37 and 38 are responsive to actuation of a double throw switch 39 of the mercury type which is mounted on the frame 11 in the manner best seen in Figure 1. Frame standards 21 at their upper end are interconnected by a transversely extending brace 40 that between its ends has a forwardly extending arm 41 pivotally connected thereto as at 42. The arm 41 is an inverted channel-shaped member and at its free end has the switch 39 rigidly affixed thereto, the switch being thus mounted for movement in a vertical plane.

In order to support the free end of the arm 41 and to cause movement of the arm in response to movement of the auxiliary frame 24, there is an adjustable linkage interconnecting the arm and frame 24. Pivotally connected to the cross beam 30, as at 43, is a rearwardly extending bar 44 that has a plurality of holes 45 extending transversely therethrough. The bar 44 is mounted on beam 30 in alignment with the switch mounting arm 41 and on its upper surface mounts an adjustable extension member 46. Set screws (not shown), or the like, removably fasten the extension member 46 to bar 44 whereby member 46 can be adjusted longitudinally on the bar 44. At its rear end member 46 is formed into an upwardly opening bracket 47 to rotatably support a roller 48 that engages the web of channel-shaped arm 41 between the inverted walls thereof.

Pivotally connected to the bar 44 through one of the holes 45 is the upper end of an elongate rod 49 whose lower end is pivotally connected to the front end of the auxiliary frame 24. With this arrangement, raising and lowering of the frame 24 is transmitted through rod 49, bar 44, extendible member 46 and roller 48 to the switch supporting arm 41. By reason of the adjustable connection of the rod 49, bar 44 and member 46, the amplitude of movement of switch 39 can be varied for reasons to be hereinafter set forth.

The structure just described serves to open switch 39 in response to movement to adjusted position of the knife 26. The closing of switch 39 to actuate the knife moving means is accomplished by the arrangement best seen in Figure 1. The frame 11 at a position in advance of the knife 26 and just above conveyer 13 is provided with a transversely extending shaft 50 that is adapted to pivotally support a rearwardly extending sensing bar 51. Referring to Figure 2, it will be seen that the sensing bar 51 is connected to the shaft 50 at a point vertically above the slots 20 of the fish carrying buckets 16 so that the bar 51 is vertically movable in alignment with the slots 20, which are adapted to receive the bar therein. It will be noted that the sensing bar thus is adapted to engage the belly of fish carried by conveyer 13 at deeper portions thereof and transversely spaced apart from the knife 26.

As is shown in Figure 1, the sensing bar 51 extends rearwardly to a position adjacent to knife 26. Since it is desirable to have the knife 26 in adjusted position before the fish reaches it, the bar 51 is preferably adapted to be displaced by the fish at a point slightly in advance of the knife and to be held in displaced position until the fish has been cut. Accordingly, bar 51 converges towards conveyer 13 until a point just in advance of the forward edge of knife 26 at which point it curves slightly to continue rearwardly in a path approximately parallel to conveyer 13. At its rear end, at a point beyond the axis of the knife 26, the bar 51 curves sharply upwardly.

The just described configuration of bar 51 is adapted to cause adjustment of knife 26 in the interval between the cutting of successive fish by the displacement of the sensing bar by the next fish. This displacement of bar 51 is transmitted to the double throw switch 39 by an elongate irregularly shaped link rod 52 whose lower end is pivotally connected to the bar 51 and whose upper end is pivotally connected to a switch lever 53 that protrudes rearwardly from the housing of switch 39. The upper portion of link 52 is vertically disposed and carries a pair of spaced-apart collars 54 that are releasably held thereto by long stemmed set screws 55. A transversely extending stop rod 56 is rigidly mounted to cross beams 30, said stop rod extending between the stems of set screws 55 so as to limit the range of movement of the link 52, switch lever 53, and sensing bar 51 so as to limit movement of frame 24 and knife 26 to a predetermined range.

In the operation of the gulleting machine 10, the fish are placed in the conveyer buckets 16 at the front end of the machine, i.e., at the right as viewed in Figure 1. The loading operator in placing the fish in buckets 16 will place the fish belly up and with the gills in alignment with the cutter 26. The alignment of the fish gills with the cutter is accomplished by placing the gills in registration with the left end slot 18 of each bucket 16. The fish are then continuously carried towards the rotary knife 26 in response to actuation of the motor 15.

The sensing bar 51 will normally tend to occupy a lowermost position determined by the engagement of the upper set screw 55 with the stop rod 56. In such lowermost position, the clearance between the sensing bar 51 and the conveyer 13 is less than the depth of the smallest fish expected to be handled by the machine. Thus, as the first fish encounters the sensing bar 51, the switch lever 53 is moved upwardly closing one terminal thereof to actuate the solenoid controlling the air pressure valve 37. The valve 37 then opens to admit air under pressure to the lower side of the piston enclosed in the cylinder 31 whereby the piston rod 33 is moved upwardly. Such upward movement of the piston 33 will continue as long as the valve 37 is open whereby the frame 24 that carries the knife 26 is also elevated. Raising of the frame 24 will simultaneously cause raising of the switch 39 through the rod 49, bar 44 and extendible member 46. Thus, as long as the sensing bar 51 is rising, the switch 39 is also rising whereby the relative positions of the switch lever 53 and switch 39 will remain unchanged to maintain the switch in closed condition to actuate the valve 37. Then, when the sensing bar 51 has been displaced upwardly to the extent required for the passage of the fish engaging it, the upward travel of the switch lever 53 will stop but the switch 39 will continue its upward travel until it reaches a switch-opening position relative to the switch lever 53. The switch 39 will then open to de-energize the solenoid controlling the valve 37, which will then return to its normally closed position.

When the knife 26 has been elevated in the manner just described, it will be adapted to penetrate the fish to a depth just sufficient to sever the gullet of the fish without intruding into the back loin of edible meat. This upward adjustment of knife 26 into the proper position will take place in the interval between the time at which the sensing bar 51 is first displaced by the fish and the time that the fish first contacts the knife 26. The knife is maintained in this properly adjusted position by virtue of the rearward extension of the sensing bar 51 that is disposed in substantial parallelism to the conveyer 13. The fish thus moves past the knife 26 until the fish clears the sharply upwardly curved end of the sensing bar 51 at which time the next fish will have advanced to a position for initial engagement with the sensing bar. Thus if the next fish is larger than the immediately preceding fish, the bar 51 will once again be moved upwardly to effect a corresponding adjustment in the knife 26. If the next fish is dimensionally shallower than the immediately preceding fish, the bar 51 of its own weight will gravitationally drop into contact with the next fish.

Assuming the succeeding fish to be smaller than the immediately preceding fish which has just been cut, the sensing bar 51 will drop as aforesaid into contact with the smaller fish. This dropping of the sensing bar 51 will immediately cause the switch lever 53 to pivot downwardly in order to close the circuit to another terminal of the switch 39 which is adapted to energize the solenoid controlling the air relief valve 38. The air pressure on the lower side of the piston contained in the cylinder 31 is thereby vented to the atmosphere to permit lowering of the piston rod 33 with consequent lowering of the knife 26 and frame 24. When the sensing bar 51 has fallen into contact with the smaller fish, the downward travel of the switch lever 53 will stop but the switch 39 will continue downwardly until it has moved into a switch-opening position relative to the switch lever 53. The switch 39 being thus opened, the solenoid controlling the valve 39 is immediately de-energized whereby the valve returns to its normally closed position. The knife 26 is thus lowered into properly adjusted position to cut the smaller fish to the proper depth in the manner just described for the larger fish. As is apparent the link rod 52 extending between the switch lever 53 and sensing bar 51, on the one hand, and the rod 49, bar 44 and member 46 interconnecting the frame 24 and switch mounting arm 41, on the other hand, together constitute an equalizing linkage which tends at all times to return the switch 39 to an open position.

This control arrangement is adaptable to a variety of fish dressing machines. In the present application, however, it will be noted that the arrangement is adjustable to compensate for a difference between the desired amplitude of movement of the rotary knife 26 and the amplitude of movement of the sensing bar 51.

As between fish of different sizes placed in the bucket 16, the difference in depth of the belly portions of the fish to be contacted by the sensing bar 51 is greater than the difference in depth of the desired penetration of the rotary knife 26 through the throats of the fish. Accordingly, it is necessary to compensate for these differences by reducing the amplitude of movement of the knife 26 as compared to the movement of the sensing bar 51. For any given species of fish it will be found that the ratio between the amplitudes of these two movements will be constant, or substantially so. In order to effect the desired degree of movement of the rotary knife 26, the range of movement of the knife can be adjusted by means of the extendible member 46 and/or the hole 45 in the member 44. For example, if the member 46 is adjusted to the right as viewed in Figure 1 so that the effective length of the member 46 when combined with the bar 44 is shortened, the vertical travel of the knife 26 will be increased. Conversely, if the member 46 is extended outwardly from the bar 44, the range of travel of the knife 26 will be decreased. By properly adjusting the member 46 and the bar 44, the gulleting machine 10 can be adapted to handle different species of fish.

It will be noted (Fig. 1) that the rod 49 includes a turnbuckle for altering the length of the rod and consequently, changing the elevation of knife 26 relative to sensing bar 51. This adjustment, however, does not appreciably alter the ratio of movement of knife 26 as compared to sensing bar 51. This arrangement permits compensation for the fact that the sensing bar 51, although very light, will sink appreciably into a soft fish whereby the knife 26 will penetrate more deeply than is desired. Thus, when a soft, fresh catch of fish is to be processed, rather than frozen fish, the turnbuckle of rod 49 is adjusted to elevate knife 26 relative to sensing bar 51 without affecting the ratio of movement therebetween. As a result, the knife 26 will penetrate only to the desired depth even though the sensing bar 51 actually depresses the contour of the soft fish.

Referring now to Figures 3 and 4 of the drawings, there is shown a tuna belly slitting machine, designated generally by the numeral 60, embodying another form of the control means of my invention. The frame of the machine 60 includes a pair of motor driven sprockets (not shown) at opposite ends thereof that are adapted to support an endless conveyer 61. As is shown in Figure 3, a longitudinally extending, substantially horizontal rail 62 supports the upper flight of conveyer 61 which mounts a plurality of longitudinally extending, substantially V-shaped buckets 63. As viewed in Figure 3 the conveyer 61 is adapted to move from right to left, the fish, after gulleting in machine 10, being placed in the buckets 63 with their bellies up and preferably head first.

The frame of machine 60 includes a pair of upright standards 64 between which fish are carried by the conveyer 61 and that at their upper ends are rigidly interconnected by a pair of parallel cross braces 65. The standards 64 are preferably made from right angle beams and each standard mounts a strap 66 that extends vertically parallel along a forwardly facing leg of the beam between conveyer 61 and the upper end of the standard. Straps 66 are spaced apart from standard 64 by spacers 67 and are fastened to the standards by bolts 68, or the like, passing through the spacers 67.

The structure just described is adapted to vertically slidably support on the standards 64 a knife and motor mounting frame 69. As can be seen in Figure 4, this frame is of substantially rectangular configuration and includes a pair of opposite side members 70 that are slidably received in the space between standards 64 and straps 66. The members 70 are preferably made of beams that are T-shaped in cross-section so that the center ribs thereof will slidably engage the inner faces of standard 64 to maintain the frame 69 in alignment with the standards.

At the lower end of frame 69 the side members 70 thereof rigidly mount a pair of oppositely disposed pillow blocks 71 between which a shaft 72 is journaled. Midway between the pillow blocks 71 and directly over the longitudinal center line of conveyer 61, a rotary knife 73 is fastened to shaft 72. The frame 69 also carries a motor 74 that is adapted to drive 73 through a belt and pulley arrangement indicated generally at 75. In order to protect operators of the machine from material thrown by the knife 73, the frame 69 is provided with a housing 76 that encloses the upper portion of the knife 73.

In order to raise and lower the frame 69 and consequently move the knife 73 into adjusted position, an air cylinder 77 is rigidly mounted at the center of cross braces 65. Slidably extending through the lower end of cylinder 77 and between the braces 65 (Fig. 3) is a piston rod 78 whose inner end rigidly mounts a piston (not shown) that is reciprocally slidable in the cylinder. The upper end of cylinder 77 is vented to the atmosphere through a bore 79 while the lower end of the cylinder opens into a conduit 80 that leads to an air compressor, or the like (not shown). Interposed in the conduit 80 is a normally closed solenoid valve 81 that can be automatically opened to communicate the source of air pressure to the lower side of the cylinder piston to raise the rod 78. A normally closed solenoid valve 82 is offset from the conduit 80 at a point between valve 81 and cylinder 77, and can be automatically opened to bleed pressure from the lower side of the cylinder piston to the atmosphere to permit lowering of the rod 78. The lower end of rod 78 is connected to the upper end of frame 69 by a bolt or the like, as is indicated at 83, whereby reciprocating movement of the rod is transmitted to the frame.

In order to control the operation of the valves 81 and 82 the vertically slidable frame 69 carries a double throw mercury switch 84 on a rigidly mounted arm 85 that extends rearwardly from the upper end of frame 69. The switch 84 is normally open and is provided with a pivoted control lever 86. An irregularly shaped link rod 87 is pivotally connected at its upper end to the switch lever 86 and at its lower end is pivotally connected to the free end of a pair of sensing bars 88 that at their forward ends are pivotally connected to the knife housing 76 by a shaft 89. The sensing bars 88 and link rod 87 are pivotally movable independently of the frame 69 and therefore move the switch lever 86 independently of the switch 85, which moves with the frame 69. Thus, relative movement between switch 84 and lever 86 controls opening and closing of the valves 81 and 82 in response to variations in size of fish passing under sensing bars 88.

In the belly slitting machine 60 the rotary knife 73 is disposed in a vertical plane and also moves in a vertical plane. The lateral space required for its action is thus no more than the thickness of the knife itself, so that it is possible to place the sensing element immediately adjacent thereto in order to react to the part of the fish to be cut rather than react to a dimensionally different part. Accordingly, the sensing element takes the form of a pair of closely spaced parallel bars 88 between which the knife 73 is mounted whereby the sensing bars contact the fish on the belly along a line closely adjacent to the line to be cut by the knife 73.

The sensing bars 88 at their forward ends curve downwardly and rearwardly from the shaft 89 to a point just in advance of knife 73 and then extend rearwardly in approximate parallelism to conveyer 61. The bars 88 are thus adapted to be displaced by an oncoming fish before the fish reaches knife 73 in order to cause the knife to be adjusted to proper position before the fish reaches it. The long straight portions of bars 88 serve to maintain the bars in displaced position until the fish has been cut and moved past the knife 73. As examination of Figure 3 will show the rearward extension of the bars 88 for an appreciable distance past knife 73 will prevent the knife from lowering into the tail portion of the fish behind the vent.

With the configuration of the sensing bars 88 just described, the knife 73 will not tend to follow the longitudinal profile of the fish being cut but will tend to hold only one vertically adjusted position for each fish as is indicated by the dotted cutting line 90 in Figure 3. However, as is apparent, if it is desired for this or other applications to have the particular tool employed follow a line conforming to a curved profile, the configuration of the sensing element can be changed in length and profile and even reduced to a point of contact to make it extremely sensitive to changes in profile of the fish being dressed.

In order to limit the range of movement of the knife carrying frame 69 one of the vertical standards 64 has a rearwardly extending stop rod 91 rigidly connected thereto. Vertically spaced apart on the link rod 87 are a pair of collars 92 that are adjustably held in place by long stem set screws 93. The free end of the stop rod 91 is disposed between the set screws 93 so that during raising or lowering of the frame 69, upon either of the set screws coming into contact with the stop rod 91, the vertical movement of the link rod 87 is at once arrested thus causing a return of the switch lever 86 to switch opening position whereby either of the valves 81 and 82 is closed to prevent further movement of the frame 69.

The operation of the tuna belly slitting machine 60 is believed to be apparent from the foregoing description. It will be noted that its operation is essentially identical to the operation of the gulleting machine 10. It will be noted, however, that the control mechanism for the belly slitting machine is simplified in that the switch 84 is carried on the knife frame 69, whereas in the gulleting machine 10 the switch 39 is pivotally connected to the machine frame 11. Furthermore, since in the present instance the knife 73 acts on the same dimension as the sensing bars 88, there is no need for an adjustable linkage such as is used in the gulleting machine 10, i.e. the extendible member 46, bar 44 and switch mounting arm 41.

As will be apparent, the control means previously described are both susceptible of many variations. A simplified alternate form of valve control means is shown in Figure 5 which shows a valve structure that can be used in lieu of the previously described electrical switches and solenoid actuated valves.

Figure 5 shows a valve 100 that has a tubular body 101 closed at one end by a wall 102. A conduit 103 leads from a source of air under pressure (not shown) to communicate with the interior of the body 101 at a point in longitudinal alignment with a leg 104 of a second conduit 105 that leads to the lower side of the cylinder piston used to move the tool mounting frame. The second conduit 105 has another leg 106 which also communicates with the interior of the valve body 101 but at a point circumferentially remote from the connection of leg 104 with the valve body. In longitudinal alignment with the connection of leg 106 and body 101, a conduit 107 communicates the interior of the valve body with the atmosphere.

The body 101 is adapted to rotatably seat a cylindrical valve plug 108 that protrudes outwardly from the open end of the body 101. The outer end of the valve plug 108 has a transversely extending crank arm 109 whose free end is pivotally connected by a pin 110, or the like, to the upper end of a link rod 111 that like the rods 87 and 52 of the previously described machines is pivotally connected at its lower end to a sensing element. The portion of valve plug 108 disposed in the interior of the valve body 101 is formed with a pair of longitudinally extending channels 112 and 113 that are longitudinally and circumferentially spaced apart. The channel 112 is thus adapted to be moved into registration with the conduit 103 and the leg 104 of the conduit 105 while the channel 113 is adapted to be moved into registration with the leg 106 of conduit 105 and the conduit 107.

The valve 100 is shown in Figure 5 in closed position. That is, neither of the channels 112 and 113 is in registration with any of the conduits. When the sensing element connected to the lower end of the link rod 111 is displaced upwardly due to the passage of a fish thereunder, the crank arm 109 is caused to be rotated in a direction to bring the channel 112 into registration with the conduit 103 and the leg 104 of the conduit 105. The channel 113 remaining closed, air under pressure enters the valve from conduit 103 to pass through channel 112 and through leg 104 to be carried by the second conduit 105 to the lower side of the cylinder piston whereby the tool mounting frame is elevated. Conversely, if the sensing element connected to the lower end of the link rod 111 drops, the crank arm 109 is rotated in the opposite direction from the position shown in Figure 5 to bring the channel 113 into registration with the leg 106 of the conduit 105 and with the conduit 107 whereby the pressure under the lower side of the cylinder piston is vented to the atmosphere in order to permit lowering of the tool mounting means.

It will be understood that the valve body 101 can be rigidly mounted to the end of the arm 41 of the gulleting machine 10 or to the end of the arm 85 of the belly slitting machine 60. As will be apparent with this arrangement, the opening of the valve 101 through either of the channels 112 and 113 is accomplished by the previously described movement of the crank arm 109 whereas the closing of the valve is accomplished by the means previously described for closing the switches 39 and 84.

Another form of valve that can be used in lieu of the previously described electrical switches and solenoid valves is shown in Figure 6 and designated generally by the numeral 115. This valve includes a body 116 that is formed with a substantially Y-shaped channel 117 therethrough. The opposite ends of the channel 117 terminate in an air inlet port 118, that can be connected to a source of air under pressure by any convenient means, and an air outlet port 119, which opens into the atmosphere. Communicating with the channel 117 at a point intermediate the port 118 and 119 is a port 120 that can be communicated to the lower side of the air cylinder by any convenient means.

The inlet port 118 and outlet port 119 are coaxially aligned to open into opposite sides of the valve body 116, and each of these ports is adapted to seat a valve member 121 that has a stem which protrudes into a cavity 122 formed in the body 116. Each of the valve members 121 mounts a compression spring 123 that yieldably maintains the valve in closed position. The stem ends of the valve members 121 are adapted to receive therebetween a lever 124 whose inner end is pivotally connected to the body 116 as indicated at 125. Pivotally connected to the free end of the lever 124 is the upper end of a link rod 126 whose lower end is connected to a sensing element.

As is apparent if the sensing element connected to the link 126 is moved in either direction from the neutral position shown in Figure 6, one or the other of ports 118 and 119 will be opened. Thus, if the link rod 126 moves upwardly the port 118 is caused to be opened whereby air under pressure is communicated to the air cylinder in order to lift the tool mounting means. Conversely if the link rod 126 is lowered, the port 119 is caused to be opened whereby pressure in the air cylinder is relieved to the atmosphere to permit lowering of the tool mounting means.

Various modifications and changes may be made with respect to the foregoing description without departing from the spirit of the invention or the scope of the following claims.

I claim:

1. A fish processing device, comprising: a frame; fish conveying means mounted on said frame; a tool on said frame that is adapted for working engagement with fish carried by said conveying means in a given path, said tool being reciprocally movable within a predetermined range for adjustment relative to each of said fish; power means on said frame to reciprocate said tool within said predetermined range; a sensing element on said device that is normally gravitationally suspended in a lowermost position in the path of fish carried by said conveying means and adapted for displacement by each of said fish at a point in advance of said tool, said element being adapted for displacement of a magnitude proportional to the size of each fish intercepted thereby and normally tending to return to its lowermost position; means operatively associated with said element and with said power means to translate displacing and returning movement of said element into actuation of said power means to cause adjusting movement of said tool in a direction in accordance with the direction of movement of said sensing element, such adjustment of said tool occurring in the interval between the initial contact of a fish with said element and its initial contact with said tool; and means operatively associated with said actuating means, tool and sensing element to de-activate said power means after said tool has undergone movement of a magnitude proportional to the magnitude of response of said sensing element.

2. A fish processing device, comprising: a frame; fish conveying means mounted on said frame; a tool on said frame that is adapted for working engagement with fish carried thereunder in a given path by said conveying means, said tool being mounted for reciprocal movement within a predetermined range for adjustment towards and away from said fish; normally inactive power means on said frame that is operatively connected to said tool to reciprocate said tool within said predetermined range; a sensing element on said device that normally tends to return to a lowermost position in the path of fish carried by said conveying means towards said tool at a position in advance of said tool, said element being adapted to intercept said fish and being yieldable upwardly from said lowermost position in response to the passage of a fish thereunder, the magnitude of such displacement being proportional to the size of said fish; and lost motion means interconnected with said element, said power means, and said tool and adapted to translate displacing and returning movement of said element into delayed actuation of said power means to cause adjusting movement of said tool in a direction in accordance with the direction of movement of said sensing element, such adjustment of said tool occurring in the interval between the initial contact of a fish with said element and its initial contact with said tool.

3. A fish processing device, comprising: a frame; fish conveying means mounted on said frame; tool mounting means on said frame adapted for substantially vertical movement towards and away from said conveying means within a predetermined range; a tool carried by said mounting means that is adapted for working engagement with fish carried by said conveying means in a given path; normally inactive power means on said frame drivingly engaged with said mounting means to reciprocate said tool mounting means within said predetermined range whereby said tool can be moved to adjusted position relative to each of said fish, said power means when inactive being adapted to maintain said tool mounting means immobile; a sensing element on said device that normally tends to return to a lowermost position in the path of fish carried by said conveying means towards said tool and positioned in advance of said tool, said element being yieldable upwardly from said lowermost position in response to the passage of a fish thereunder, the magnitude of such displacement being proportional to the size of said fish; an actuator operatively associated with said power means for turning said power means on and off and mounted for co-movement with said tool; and lost motion means interconnecting said sensing element and said actuator to energize and de-energize said actuator in response to movement of said element and said tool whereby adjusting movement of said tool occurs in the interval between the initial contact of a fish with said element and its initial contact with said tool.

4. A fish processing device, comprising: a frame; a conveyer on said frame that is adapted to carry fish through said device; tool mounting means on said frame adapted for substantially vertical movement towards and away from said conveyer within a predetermined range; a tool carried by said mounting means that is adapted for working engagement with fish on said conveyer; pneumatic power means on said frame to reciprocate said tool mounting means within said predetermined range whereby said tool can be moved to adjusted position relative to each of said fish; a sensing element pivotally connected to said device for vertical movement and adapted to be initially contacted by fish advancing towards said tool at a point in advance of said tool, said element gravitationally tending to return to a lowermost position from which position it is upwardly displaceable in response to a fish slidably passing thereunder; valve means operatively associated with said sensing element to translate up and down movement of said sensing element into actuation of said power means to cause adjusting movement of said tool in a direction in accordance with the direction of movement of said sensing element, such adjustment of said tool occurring in the interval between initial contact of a fish with said element and its initial contact with said tool; and means interconnecting said power means, valve means and said tool mounting means to de-activate said power means when said tool has been moved a distance proportional to the magnitude of movement of said sensing element.

5. A fish processing device, comprising: a frame; a conveyer on said frame that is adapted to carry fish through said device; tool mounting means on said frame adapted for substantially vertical movement towards and away from said conveyer in a predetermined range; a tool carried by said mounting means that is adapted for working engagement with fish carried by said conveyer; pneumatic power means on said frame to reciprocate said tool mounting means within said predetermined range whereby said tool can be moved to adjusted position relative to each of said fish; first normally closed valve means operatively associated with said power means that can be opened to cause said power means to elevate said tool mounting means; second normally closed valve means operatively associated with said power means that can be opened to cause said power means to lower said tool mounting means; a sensing element pivotally connected to said device for vertical movement that is adapted to be initially contacted by fish advancing towards said tool at a point in advance of said tool, said element gravitationally tending to return to a lowermost position from which position it is upwardly displaceable in response to a fish slidably passing thereunder; valve actuating means operatively associated with said sensing element and both of said valve means to translate upward displacement of said sensing element into opening of said first valve means to adjust said tool upwardly and to translate downwardly returning movement of said element into opening of said second valve means to adjust said tool downwardly; and means interconnecting said valve actuating means and said tool to de-activate said valve actuating means when said tool has been moved a distance proportional to the magnitude of movement of said sensing element.

6. A fish processing device, comprising: a frame; a conveyer on said frame that is adapted to carry fish through said device; tool mounting means on said frame adapted for substantially vertical movement towards and away from said conveyer within a predetermined range; a tool carried by said mounting means that is adapted for working engagement with fish carried by said conveyer; pneumatic power means on said frame to reciprocate said tool mounting means within said predetermined range whereby said tool can be moved to adjusted position relative to each of said fish; a first normally closed solenoid valve means operatively associated with said power means that can be opened to cause said power means to elevate said tool mounting means; a second normally closed solenoid valve means operatively associated with said power means that can be opened to cause said power means to lower said tool mounting means; a sensing element pivotally connected to said device for vertical movement that is adapted to be initially contacted by fish advancing towards said tool at a point in advance of said tool, said element gravitationally tending to return to a lowermost position from which position it is upwardly displaceable in response to a fish slidably passing thereunder; a normally open double throw electrical switch that in a first closed condition causes opening of said first valve means to adjust said tool mounting means upwardly and that in a second closed condition causes opening of said second valve means to adjust said tool mounting means downwardly; means for mounting said switch on said device for vertical movement along with said tool; and an actuating lever for said switch that is responsive to movement of said sensing element to translate movement of said element into closing of said switch, said switch returning to its normally open condition by movement of said switch after movement of said element has stopped whereby to de-activate said power means and thus arrest said tool in adjusted position.

7. A device as set forth in claim 6 in which said means for mounting said switch for movement with said tool are adjustable to vary the ratio between the range of movement of said switch and the range of movement of said tool whereby to vary the ratio between the amplitude of movement of said sensing element and the amplitude of movement of said tool.

8. A fish processing device, comprising: a machine frame; a conveyer on said frame that is adapted to carry fish through said device; an auxiliary frame pivotally connected to said machine frame having a free end movable within a predetermined range in a substantially vertical direction towards and away from said conveyer; a tool carried by said auxiliary frame that is adapted for working engagement with fish carried by said conveyer; an air cylinder pivotally connected to said machine frame that includes a reciprocally slidable piston which mounts a piston rod that extends through the lower end of said cylinder, the lower end of said piston rod being pivotally connected to the free end of said auxiliary frame; a source of air under pressure that is in operative communication with the lower side of said cylinder piston; a normally closed solenoid actuated air pressure valve that is operatively interposed between said cylinder and said source, said valve when open communicating said source with the lower side of said cylinder piston to cause elevation of said auxiliary frame and tool whereby said tool can be upwardly adjusted; a normally closed solenoid actuated relief valve operatively associated with the lower side of said cylinder piston that can be opened to relieve pressure therein to permit downward adjustment of said tool and auxiliary frame; an elongate sensing bar that is pivotally connected to said machine at a point laterally spaced apart from alignment with said tool, said sensing bar extending rearwardly from its pivotal connection to a position sidewardly adjacent said tool and said bar converging downwardly and rearwardly from its pivotal connection to a point just in advance of said tool adapted for initial contact with said fish from which point it continues rearwardly in substantial parallelism to said conveyer and said bar further gravitationally tending to return to a lowermost position from which position it is upwardly displaceable in response to a fish slidably passing thereunder; a switch mounting arm pivotally connected to said machine frame; means interconnecting the free end of said auxiliary frame and said switch mounting arm to cause vertical movement of said arm in unison with vertical movement of said auxiliary frame, said means being adjustable to vary the ratio between the amplitude of movement of said arm and the amplitude of movement of said auxiliary frame; a normally open double throw electrical switch rigidly mounted on the free end of said arm that in a first closed condition causes opening of said air pressure valve to cause upward adjustment of said auxiliary frame and tool, and that in a second closed condition causes opening of said relief valve to permit downward adjustment of said tool and auxiliary frame; and actuating lever means interconnecting said switch and sensing bar that is responsive to pivotal movement of said sensing bar to translate movement of said bar into closing of said switch, said switch returning to its normally open condition by movement of said switch after pivotal movement of said element has been arrested whereby to permit closing of both said valves and thus arrest said tool in adjusted position.

9. A device as set forth in claim 8 in which said switch lever means includes an elongate vertically extending link rod and a pair of vertically spaced apart stop elements are adjustably connected to said rod, said machine frame rigidly mounting a stop member that extends between said stop elements for engagement therewith to arrest movement of said sensing bar and switch lever means whereby to limit the range of reciprocal movement of said auxiliary frame.

10. A fish processing device, comprising: a machine frame; a conveyer on said frame that is adapted to carry fish through said device; an auxiliary frame on said machine frame that is vertically slidably mounted above said conveyer for movement towards and away from said conveyer within a predetermined range; a tool carried by said mounting means that is adapted for working engagement with fish carried by said conveyer; an air cylinder mounted on said machine frame that includes a piston reciprocally slidably mounted therein, said piston carrying a piston rod extending through the lower end of said cylinder, the lower end of said rod being connected to said auxiliary frame whereby said auxiliary frame and tool can be reciprocally moved within a predetermined range; a source of air under pressure in operative communication with the lower side of said cylinder piston; a normally closed solenoid actuated air pressure valve operatively interposed between said source and said cylinder that can be opened to cause upward adjustment of said auxiliary frame and tool; a normally closed solenoid actuated relief valve operatively associated with the lower side of said cylinder piston that can be opened to permit downward adjustment of said auxiliary frame and tool; an elongate sensing bar extending longitudinally of said conveyer and having a pivotal connection with said auxiliary frame at a point in advance of said tool, said sensing bar being thus adapted for vertical movement towards and away from said conveyer, said sensing bar extending rearwardly and downwardly from said pivotal connection to a point just in advance of said tool that is adapted to initially contact fish carried by said conveyer, said sensing bar further extending rearwardly from said point in substantial parallelism to said conveyer to terminate at a rear end that is disposed rearwardly of said tool; a normally open double throw electrical switch rigidly mounted on said auxiliary frame that in a first closed condition causes opening of said air pressure valve to adjust said auxiliary frame and tool upwardly, and that in a second closed condition causes opening of said relief valve to permit adjustment of said auxiliary frame and tool downwardly; a pivotal actuating lever for said switch; and an elongate vertically extending link rod that is pivotally connected at its upper end to said actuating lever and that is connected at its lower end to the rear end of said sensing bar whereby to translate movement of said sensing bar into closing of said switch, said switch returning to its normally opened condition by movement of said switch and auxiliary frame after pivotal movement of said sensing bar has been arrested whereby to close said valves and thus arrest said tool in adjusted position.

11. A fish processing device, comprising: a frame; linear fish conveying means mounted on said frame; a tool on said frame adapted for adjusting movement into and out of working engagement with fish carried by said conveying means; power means associated with said tool for moving said tool for adjustment thereof whenever said power means is actuated; a fish sensing means on said device responsive to variations in dimension of successive fish carried by said conveying means, said sensing means being positioned on said device in advance of said tool in the direction of travel of said fish with respect to said tool thereby to respond to a dimension of a given fish before said given fish is carried by said conveying means into contact with said tool, the magnitude of each response of said sensing means being proportional to the magnitude of such variations; means connected to said sensing means to translate responses of said sensing means into actuation of said power means to cause adjusting movement of said tool during the interval, after initial response of said sensing means, in which said given fish is carried by said conveying means into initial contact with said tool; and means associated with said sensing means to deactivate said power means after said tool has undergone movement of a magnitude proportional to the magnitude of response of said sensing means.

References Cited in the file of this patent
UNITED STATES PATENTS

| | | |
|---|---|---|
| 2,565,727 | Henderson | Aug. 28, 1951 |
| 2,683,893 | Baader | July 20, 1954 |